March 12, 1963  R. J. BAKER  3,080,882
CONDENSATE VALVE
Filed Feb. 23, 1960  2 Sheets-Sheet 1

INVENTOR.
RALPH J. BAKER
BY
Whittemore, Hulbert & Belknap
ATTORNEYS

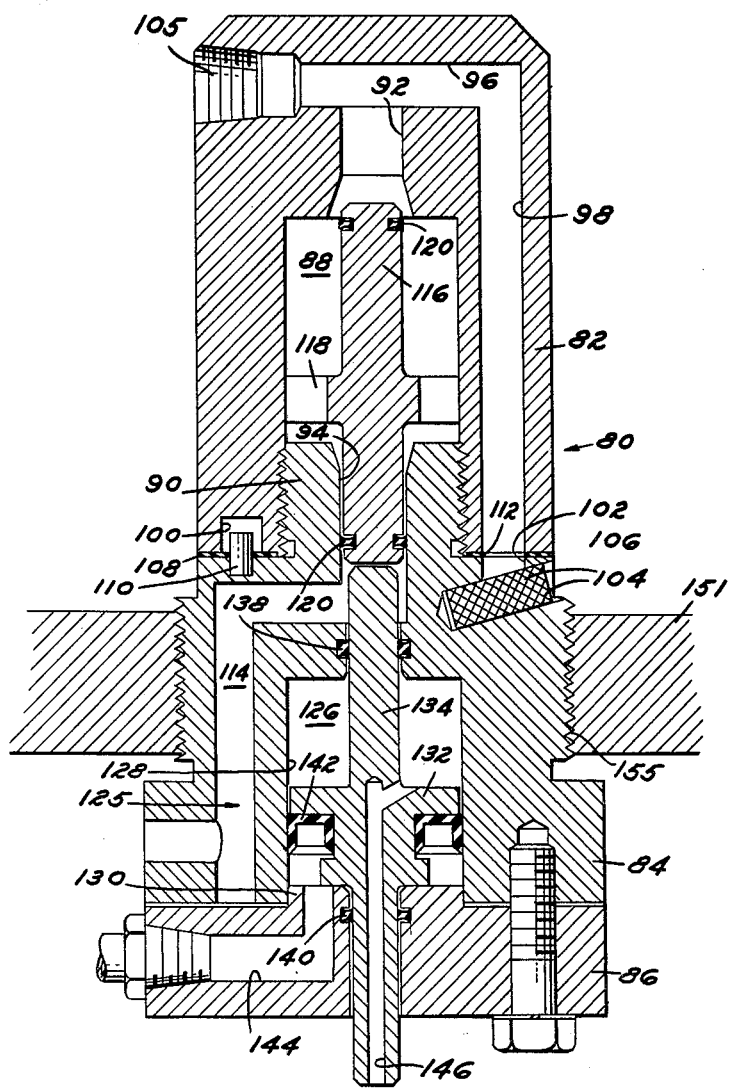

United States Patent Office 3,080,882
Patented Mar. 12, 1963

3,080,882
CONDENSATE VALVE
Ralph J. Baker, 655 N. Main St., Marine City, Mich.
Filed Feb. 23, 1960, Ser. No. 10,484
2 Claims. (Cl. 137—204)

This invention relates to condensate valves adapted particularly for use in connection with a tank adapted to contain a gaseous medium under pressure, such as air, to keep the tank relatively free of condensate.

The invention has for one of its objects to provide a condensate valve which is capable of being inexpensively manufactured and yet which is highly efficient in the accomplishment of its intended function.

Another object of the invention is to provide a condensate valve which is adapted to be operated intermittently, and when operated to discharge condensate from the tank without any material loss of pressure.

Still another object of the invention is to provide a condensate valve of the type having a housing formed with a condensate chamber, aligned passages leading from opposite ends of the chamber for communication with the atmosphere and with a tank adapted to contain a gaseous medium such as air, and an elongated plunger extending across the chamber and longitudinally movable in opposite directions for alternate sealing engagement of its ends in the passages. In an intermediate position, the plunger sealingly engages both passages and thus the tank is never open to atmosphere. Preferably, the valve is provided with a heating element to prevent freezing.

A further object of the invention is to provide a condensate valve as described above in which an operating piston for moving the plunger is formed integrally on the plunger for operation by fluid pressure.

A still further object of the invention is to provide a condensate valve of the plunger type in which the plunger is operated by a piston and cylinder assembly separate from the plunger and condensate chamber.

Another object of the invention is to provide a condensate valve of the plunger type in which the condensate chamber and plunger are adapted to be positioned within the air tank to be shielded thereby from damage, whereby even if the operating mechanism for the plunger is exposed and damaged, the condensate valve will not release the air in the tank.

Other objects and features of the invention will become apparent as the description proceeds, especially when taken in conjunction with the accompanying drawings, illustrating preferred embodiments of the invention, wherein:

FIG. 2 is a view similar to FIG. 1 showing a modification; and

Figures 1, 3:
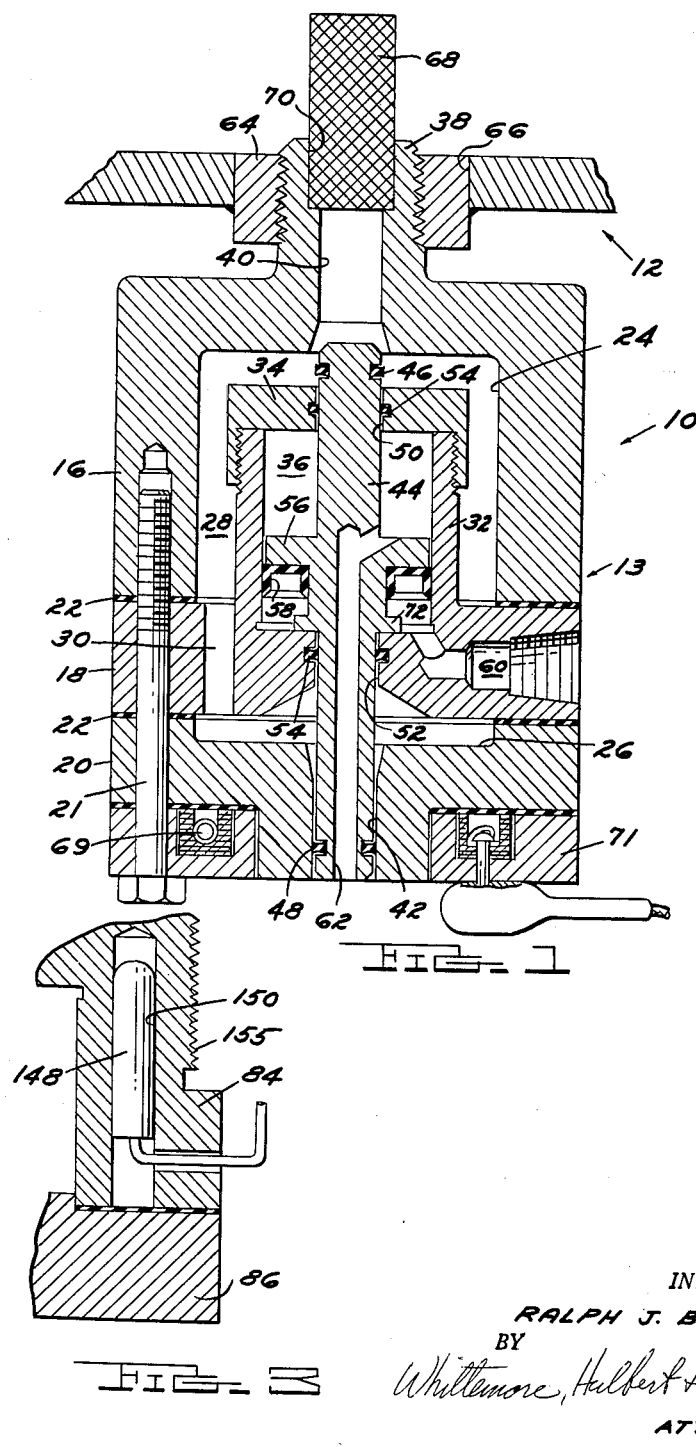
FIG. 1 is a longitudinal sectional view of a condensate valve embodying my invention.
FIG. 3 is a fragmentary sectional view of the structure shown in FIG. 2.

Referring now more particularly to the drawings and especially to FIGURE 1 thereof, the condensate valve is generally indicated at 10 and is adapted for use in connection with a tank 12 adapted to contain a suitable gaseous medium under pressure, such as air.

The condensate valve 10 comprises a housing 13 which is generally cylindrical and attached to the air tank, as illustrated. The housing is formed of three sections, an upper section 16, an intermediate section 18 and a lower section 20. The three sections of the housing are clamped together in assembled relation by bolts such as the one indicated at 21, and suitable annular gaskets 22 are clamped between the adjacent surfaces of the housing sections.

The housing section 16 is formed with a downwardly opening recess 24, and the lower section 20 is formed with an upwardly opening recess 26. The recesses 24 and 26 are cylindrical and in the assembled relation of the housing sections have a common axis. The recesses 24 and 26 cooperate to define a cylindrical condensate chamber 28 and the intermediate section 18 of the housing extends across the chamber and provides communication between the upper and lower portions thereof through one or more passages 30.

The intermediate section 18 of the housing has a cylindrical extension 32 extending into the upper section of the chamber 28, and an end cap 34 is threaded on the cylindrical extension. The extension 32 defines a cylinder 36, the cap 34 providing the upper end wall of the cylinder and the lower end wall of the cylinder being defined by an interior surface of the housing section 18. The axis of cylinder 36 coincides with that of chamber 28.

The housing section 16 is provided with a threaded extension or nipple 38 which has in it a through passage 40 communicating with the upper end of chamber 28 and aligned with the common axis of chamber 28 and cylinder 36. The lower section 20 of the housing has a passage 42 which communicates with the lower end of the chamber and is also aligned with the axis of the chamber, providing communication with the outside atmosphere at the lower end of the housing. An elongated plunger 44 extends across the chamber 28 and is reciprocable therein for sealing engagement of its opposite ends in the passages 40 and 42. The diameter of the plunger is approximately the same, although somewhat smaller than, the diameter of the passages 42 and 40, and the opposite ends of the plunger are grooved to seat the O-rings 46 and 48 which have the cross-section illustrated and which are provided to sealingly engage the passages 40 and 42.

The plunger extends through an aperture 50 in cap 34 and through an aperture 52 in the intermediate housing section 18, and O-ring seals 54 carried in grooves provided in the end cap and intermediate housing section engage the plunger to seal the cylinder 36 from chamber 28.

A piston 56 formed integrally with the plunger is disposed in the cylinder, and an annular rubber cup 58 of U-section is carried by the piston. The cylinder beneath the piston is adapted to be connected to a suitable source of pressure through a passage 60. The upper end of the cylinder is vented by way of the plunger passage 62.

The condensate valve is adapted to be threaded into a bushing or fitting 64 suitably secured in an aperture 66 in the bottom wall of tank 12 by welding, for example. When thus secured to the bottom of the tank, the common axis of the chamber 28, cylinder 36, passages 40 and 42 and plunger 44 are disposed vertically. The valve will, of course, be attached to a low point of the tank where condensate collects. However, the valve is not necessarily vertical as shown, but may assume any position and still operate effectively. In some instances the tank hole is in the end, in which event the valve extends horizontally. Preferably a filter screen element 68 is mounted in a counterbore 70 formed in the passage 40 to prevent impurities or solid matter from entering the condensate valve.

Preferably, an annular heater 69 is housed in a suitable recess in plate 71 clamped to the bottom of the valve housing with a gasket between the plate and housing. The heater may be electrically operated as shown, and is provided to keep the condensate valve warm and prevent freezing of the condensate.

The plunger normally will assume the lower position illustrated in which the rib 72 formed on the plunger engages the lower wall of the cylinder 36 to determine the limit of downward movement of the plunger. In this position, the condensate chamber 28 is sealed from the atmosphere by the O-ring 48 carried on the lower end of the plunger, but communicates with the air tank through passage 40. Condensate in the tank will flow through passage 40 into the condensate chamber where it will remain until the plunger is raised. The plunger remains in the lower position illustrated due to the pressure of air acting on the upper end of the plunger. When air under sufficient pressure is admitted to the lower end of cylinder 36 through passage 60, the piston 56 raises the plunger to an upper position in which the upper end of the plunger moves into passage 40 for sealing engagement of O-ring 46 therein and the lower end moves out of passage 42. With the tank now sealed from the condensate chamber and the condensate chamber opened to atmosphere through passage 42, the condensate therein will drain through passage 42, and when the pressure in the lower end of cylinder 36 is relieved, the plunger will return by the pressure of air in the tank to the position illustrated to complete the cycle. The plunger seals both passages 40 and 42 in an intermediate position so that at no time is the air in the tank open directly to atmosphere.

Condensate valves of this type are often used on motor vehicles and particularly buses and trucks which have an air pressure system and consequently a tank such as that shown at 12 for air under pressure. The piston normally will be operated intermittently. For example, the passage 60 might be connected with the air brake line to operate the condensate valve plunger with each operation of the brakes. Then too, the line 60 might be connected directly to the air compressor for the air tank to operate the valve whenever the air compressor operates. On buses having air-operated door motors, the condensate valve pressure line 60 might be hooked up with the door motor to operate each time the doors are opened and closed.

FIGS. 2 and 3 illustrate a modification of the invention in which the housing is generally indicated at 80 and comprises an upper housing section 82, an intermediate housing section 84 and a lower housing section 86. The upper section 80 has an elongated condensate chamber 88 which is cylindrical and which opens through the lower end of the housing section. The intermediate housing section 84 has a reduced extension 90 which threads into the lower end of chamber 88 to define the bottom wall of the chamber. The upper housing section has a passage 92 leading from the upper end of chamber 88, and the intermediate housing section 84 has a passage 94 leading from the lower end of the chamber. The passages 92 and 94 are aligned in the assembled condition of the housing and coaxial with the chamber 88. The passage 92 connects with a transverse passage 96 which leads into a longitudinal passage 98 opening through the lower end of the housing section 82. The passage 98 leads into an annular groove 100 about the lower end of housing section 82 which groove communicates with the passages 102 and 104 in the intermediate housing section. Preferably a screen element 106 is secured in the passage 104. A plug 105 closes passage 96.

As seen in FIG. 2, an annular gasket 108 seals the joint between the upper and intermediate housing sections, and a gasket locating pin 110 extends through aligned holes in the gasket and in the intermediate housing section to angularly position the gasket with its hole 112 aligned with passage 102 for free communication with the annular groove 100 in the upper section.

The lower passage 94 leading from chamber 88 leads into a passage 114 which communicates with the atmosphere. This passage is shown very close to the locating pin 110. Actually, the locating pin is shown out of position for clarity and in actual construction would be spaced from the passage 114 to avoid any thin metal sections.

A plunger 116 is provided which is elongated and coaxial with the chamber 88. The plunger extends across the chamber 88 and is reciprocable therein for alternate sealing engagement of its opposite ends with the passages 92 and 94. The wings or fins 118 on the plunger engage the cylindrical wall of the chamber to guide the reciprocation of the plunger. The opposite ends of the plunger are approximately the same diameter as, although actually somewhat smaller than, the passages 92 and 94 and are grooved to provide seats for the O-ring seals 120 which sealingly engage the passages 92 and 94.

The plunger is adapted to be raised from the illustrated position by a piston and cylinder assembly 125 which includes a cylinder 126 defined by a downwardly opening cylindrical cup-shaped recess 128 in the intermediate housing section and the boss 130 on the lower section 86 which extends into the recess. The cylinder 126 is aligned with chamber 88 as well as plunger 116, and a piston 132 reciprocates in the cylinder. The piston is formed integrally with a stem 134 which is aligned with plunger 116. The upper end of the stem passes through the end wall of cylinder 126 into passage 114 for engagement with the lower end of the plunger. The O-ring 138 engages the upper end of the stem to seal the cylinder 126 from passage 114. The lower end of the stem extends through a passage in the lower housing section 86 and a seal 140 carried by the lower housing section engages the stem to seal the cylinder. An annular rubber cup 142 of U-shaped cross-section is carried by the piston at the underside thereof, and the lower end of the cylinder is adapted to be subjected to air under pressure by suitable means through passage 144. The upper end of the cylinder is vented through the passage 146 in the piston 132 and stem 134.

Preferably a heater 148 is housed in a suitable recess 150 in the intermediate housing section 84. The heater may be electrically operated and is provided to keep the condensate valve warm and prevent freezing of the condensate.

In use, the condensate valve is threaded into a hole in the bottom wall of an air tank 151. The threads on the housing for this purpose are indicated at 155 and are carried by the intermediate section of the housing so that the upper housing section is completely within the tank and shielded from any possibility of damage by flying objects, such as stones and the like. It will be noted also that the valve extends downwardly from the tank with its chamber 88 and plunger 116 vertical. As was true of the valve shown in FIG. 1, this valve need not be mounted vertically as shown, but may assume any position and still operate effectively.

Normally the plunger 116 will assume the position illustrated, due to air pressure in the tank, in which the seal 120 on the lower end of the plunger engages passage 94 to seal the chamber from atmosphere, and the upper end of the plunger clears passage 92 to provide communication between the chamber and the air tank. Hence in this position condensate can pass into the chamber 88 through passages 92, 96 and 98, 102 and 104. When air under pressure is admitted beneath piston 132, the plunger moves to an upper position in which the O-ring seal on its upper end seals upper passage 92 to seal the condensate chamber from the tank, and its lower end clears the lower passage 94 to open the condensate chamber to atmosphere and thereby drain the condensate. In the intermediate position of the plunger, both passages 92 and 94 are sealed to prevent the air pressure in the tank from being opened directly to atmosphere.

When pressure is relieved in passage 144, the plunger will return to the lower position illustrated due to the pressure of air in the tank, and will carry the piston 132 with it. The piston 132 is lowered by the plunger. When the condensate chamber is initially opened to the air tank, the rush of air to fill the condensate chamber will carry condensate with it through the upwardly extending passage 98.

When mounted as shown, it will be apparent that a very small portion of the condensate valve is exposed beneath the air tank to reduce the likelihood of damage to a minimum. However should the lower or exposed portion of the valve be destroyed or rendered inoperative so that the piston and cylinder assembly will not function, the plunger 116 will still operate to seal the air tank from atmosphere because it will assume the normal illustrated position. The valve shown in FIGS. 2 and 3 may be operated by air under pressure from any suitable source such as one of those mentioned in connection with the valve of FIG. 1.

What I claim as my invention is:

1. A condensate valve comprising a housing formed of first, second and third housing sections arranged end-to-end, said first section having an elongated cylindrical cavity therein opening through one end thereof, said second section having a main body portion and an integral extension extending from one end of the latter part way into said cavity in said first section through the open end thereof to cooperate with the walls of said first section forming said cavity in the definition of a chamber, a first passage in said first section leading from one end of said chamber, passage means in said first section leading from said first passage for communication with a tank adapted to contain a gaseous medium under pressure, a second passage in the main body portion and extension of said second section leading from the opposite end of said chamber, passage means in the main body portion of said second section leading from said second passage for communication with the atmosphere, said second section having an elongated cylindrical cavity in the main body portion thereof coaxial with said first-mentioned cavity and opening through the opposite end of the main body portion of said second section, said third housing section having a main body portion and an integral extension extending from one end of the latter part way into the second-mentioned cavity through the open end thereof to cooperate with the walls of said second section forming said second-mentioned cavity in the definition of a cylinder coaxial with said chamber, a third passage in said main body of said second section extending from said second passage to one end of said cylinder, a fourth passage in the main body portion and integral extension of said third section leading from the opposite end of said cylinder to the atmosphere, said passages being coaxial with each other and with said chamber and cylinder, an elongated plunger within and extending across said chamber and longitudinally movable in opposite directions for alternate sealing engagement of its ends in said first and second passages, said plunger in an intermediate position sealingly engaging both first and second passages, a piston slidable in said cylinder and having a rod separate from said plunger, said rod slidably extending through said third passage and being engageable with the adjacent end of said plunger to move said plunger upon movement of said piston toward said plunger, said piston having a second rod slidable in said fourth passage, passage means in said piston and second rod for venting the end of said cylinder adjacent said third passage, and means for admitting fluid under pressure to the opposite end of said cylinder.

2. The condensate valve defined in claim 1, wherein the main body portion of said second section has an external formation for removably mounting said valve on the wall of a tank, said formation being spaced axially from said plunger toward said third section in all positions of said plunger.

References Cited in the file of this patent

UNITED STATES PATENTS

| | | |
|---|---|---|
| 578,873 | Hermansader | Mar. 16, 1897 |
| 1,646,614 | Frye | Oct. 25, 1927 |
| 1,737,933 | McCaddam | Dec. 3, 1929 |
| 2,004,717 | Thwaits | June 11, 1935 |
| 2,328,649 | Jerome | Sept. 7, 1943 |
| 2,509,597 | Hamilton | May 30, 1950 |
| 2,509,879 | Pelton | May 30, 1950 |
| 2,732,854 | George | Jan. 31, 1956 |
| 2,845,081 | George | July 29, 1958 |
| 2,989,978 | Gresko | June 27, 1961 |

FOREIGN PATENTS

| | | |
|---|---|---|
| 538,658 | Germany | Nov. 16, 1931 |